March 18, 1969  SHO TAKAYANAGI  3,433,148
MAIN AND AFTER FERMENTATION TANK FOR BEER BREWERY
Filed Sept. 6, 1966
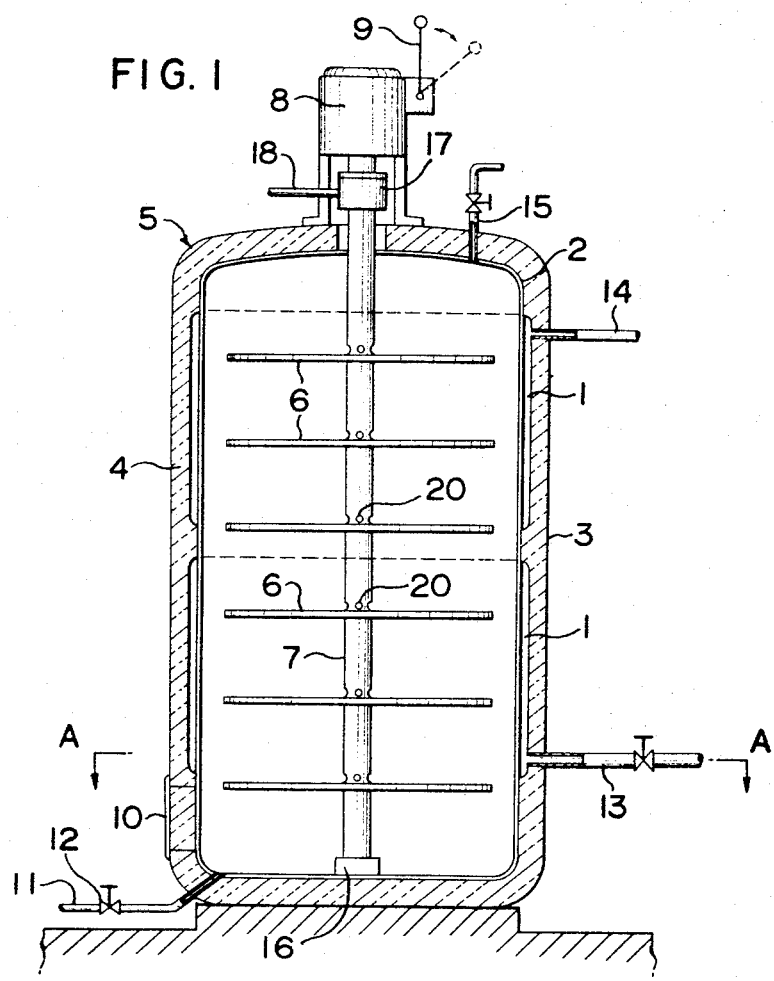
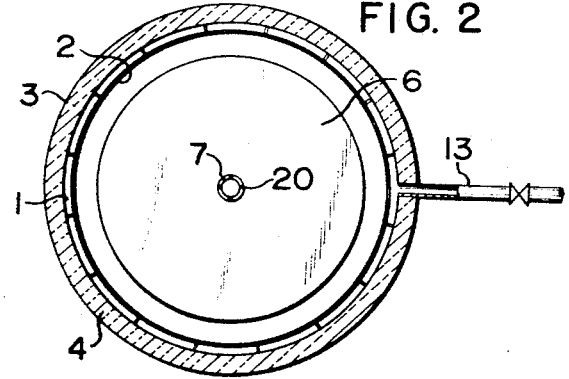
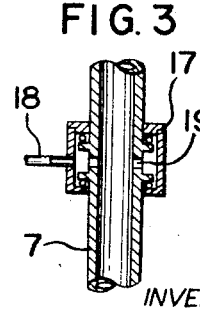
INVENTOR.
SHO TAKAYANAGI
BY
Woodhams, Blanchard Flynn
ATTORNEYS

United States Patent Office 3,433,148
Patented Mar. 18, 1969

3,433,148
MAIN AND AFTER FERMENTATION TANK
FOR BEER BREWERY
Sho Takayanagi, Tokyo, Japan, assignor to Asahi
Breweries Ltd., Tokyo, Japan
Filed Sept. 6, 1966, Ser. No. 577,206
Claims priority, application Japan, Sept. 6, 1965,
40/72,725
U.S. Cl. 99—276                                   7 Claims
Int. Cl. C12f 1/00

ABSTRACT OF THE DISCLOSURE

A fermentation and storage tank for brewing beer having a plurality of vertically spaced and parallel plates therein so that when the tank is filled with beer, said beer is divided into a plurality of layers relative to the vertical axis of the tank to facilitate a faster rate of clarification by deposition of said sediment onto said plates.

---

The present invention relates to a main and after fermentation tank for use in the brewing of beer, and more particularly to a tank structure for the described purpose.

It has been the tendency in the field of beer brewing to increase the capacities of main fermentation tanks and after fermentation tanks with the continuous increase in the demand for beer and with the progress in the design and construction of the equipment in the brewery plants. However, there has been a limit to their capacities, and especially to the liquid depths in the tanks, due to the problems encountered in the clarification of beer which is effected by the sedimentation of yeast and other coagulated substances such as proteins and hop resin separated during the course of fermentation. On the other hand, the beer product must have a prolonged shelf life. To this end, many attempts and studies have been made to improve the techniques of clarifying beer in the brewing process, and the improvement of such techniques have become a more and more important problem.

It is the primary object of the present invention to provide a tank with a large capacity which can be used for both main and after fermentation of beer during the brewing process.

Another object of the present invention is to accelerate clarification of batches of beer in the tanks by accelerating the sedimentation of yeast and other coagulated substances which separate in the beer during the main as well as the after fermentation processes.

Still another object of the present invention is to provide a main and after fermentation tank of a large capacity which requires no accommodating building, or in other words, which is suitable for being constructed in the open atmosphere.

In the brewing of beer utilizing the bottom fermentation technique, there is deposited a greater part of the yeast in the bottom portion of beer in the tank during the latter period of the main fermentation process. At the time of the completion of main fermentation, there is left, in the batch of young beer in the tank, a yeast only in an amount necessary for the after fermentation, and the remainder of the yeast is removed from the tank. However, if the yeast has a strong tendency of being suspended in the liquid or if the liquid in the tank is of a considerable depth, there occurs a difficulty in the collection of yeast by deposition effected due to its own gravity, and the tank requires a specific yeast separation means. When the liquid in the tank has a considerable depth, it is difficult to collect, by deposition or sedimentation, the proteins or the hop resin separating as coagulated substances in the beer during the fermentation process.

In the beer storage tanks, it is important to mature the flavor of the beer and also to clarify the beer by collecting the yeast and the coagulations separating therefrom. Insufficiently clarified beer in the storage tank not only would lead to an excessive load imposed on the beer filtering unit, but also often would affect the flavor and the shelf life of the product beer.

On the other hand, the velocity of clarification of the liquid in the tank due to the sedimentation of fine particles in the liquid has a close relationship to the viscosity of the liquid and also to the size and the specific gravity of the particles contained in the liquid. It will be readily understood from Stokes Law that this velocity is influenced also by the distance covered by the particles while settling to the bottom.

The present invention has been made as a result of an adroit application of such basic knowledge as stated above to the techniques of brewing beer. The present invention is characterized by the provision of a plate having either a flat face or a face slightly sloped toward its center, or a plurality of such plates disposed in the form of a plurality of vertically spaced shelves, for receiving sediments occurring in the beer, whereby the liquid layer consisting of beer in said tank is divided into substantially a plurality of layers by virtue of such plate or plates. The inventor has successfully accomplished this object by applying this invention to a fermentation tank and a beer storage tank having a large capacity and having a considerable liquid depth. In spite of the extremely simplified structure, the tank of the present invention displays a remarkable function and effect, and this will become apparent by reading the following detailed descriptions with reference to the accompanying drawings which are given simply by way of examples, wherein:

FIGURE 1 is a longitudinal cross-sectional view of an embodiment of the tank of the present invention;

FIGURE 2 is a transverse cross-sectional view taken along the line A—A in FIGURE 1;

FIGURE 3 is a longitudinal cross-sectional view of the principal portion of the water-swivel means;

Referring now to FIGURE 1, the tank which is one embodiment of the present invention, is shown in the form of an upright cylindrical tank comprising an inner sleeve 2 encompassed by a cooling jacket 1, and a heat insulator 4 disposed between the external periphery of the inner sleeve and the internal periphery of an outer sleeve 3. Such cooling means as the one herein shown in which a cooling medium is circulated is quite useful in case the tank is installed in the open field or if it is installed in a room where the temperature is not controlled. However, it is not necessary to provide a cooling means like this if the tank is installed in a room which is maintained at a low temperature. The tank may be constructed so that it has many sides or it may be constructed to have a horizontally extending cylindrical shape, in addition to said upright cylindrical shape.

Figure 4:
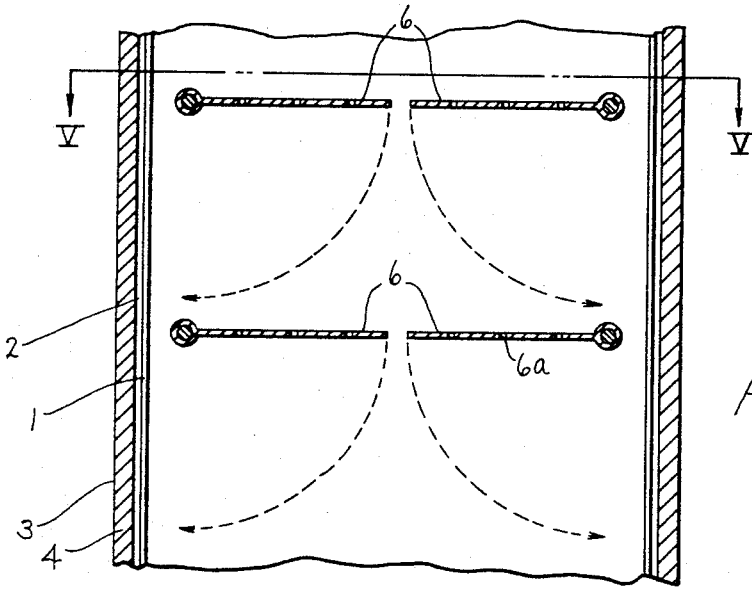
FIGURE 4 is a fragmentary, longitudinal cross-section view corresponding to FIGURE 1 and disclosing a modification in which the plates are segmented to drop downwardly.
Figure 5:
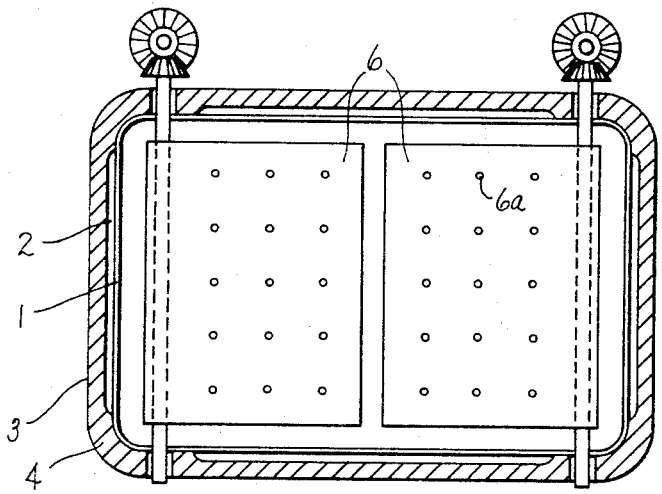
FIGURE 5 is a transverse cross-sectional view taken along the line V—V of FIGURE 4.
Figure 6:
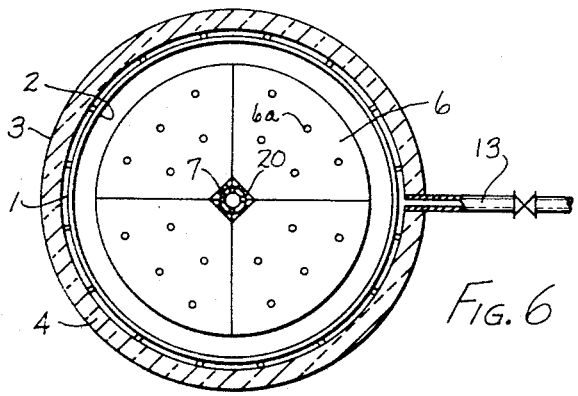
FIGURE 6 is a transverse cross-sectional view similar to FIGURE 2 and disclosing a modification in which the plates are segmented.

In the interior of the tank proper 5 are disposed a plurality of equally and vertically spaced plates 6 for receiving sediments in spaced and parallel relationship relative to each other, like shelves, in the space in the tank between the upper portion and the lower portion thereof. The peripheral edge of the plates 6 is raised to an extent sufficient for preventing the coagulated substances and yeast particles accumulated on said plate from falling out into the beer, and the plates 6 may be tapered progressively toward its center. The plates 6 may also be provided with scattered small through-holes 6a, as seen in FIGURES 4–6, for letting the carbon dioxide gas escape therethrough, which is formed and rises upwardly from the lower portion of the beer. The size of the plates 6 can vary depending on the shape of the fermentation and storage tank. Preferably, the plates 6 are of a size to cover a substantial area of the cross section of the tank. In order to facilitate the washing away of the particles accumulated on the plate, it is preferred to arrange the plates in the cylindrical tank, so that they are rotated to cause the accumulated particles to be thrown off the peripheral edges of the plates, or to arrange so that each of the plates is divided into several segments to open downwardly to let the coagulated substances, yeast or the like, drop downwardly as they are washed away. One embodiment employing such downwardly opening plates is disclosed in FIGURES 4 and 5. FIGURE 6 illustrates a further embodiment employing plates corresponding to those of FIGURE 2 but which plates are segmented so that the segments can open downwardly. The intervals between the plates and the number of plates 6 may be selected so as to be optimum, depending on the liquid depth of the tank and on the nature of the beer.

FIGURE 1 shows an example of the tank equipped with rotatable plates 6. In a tank of such structure, it is possible to completely wash away the particles accumulated on the plates by rotating the plates while pouring water onto the upper faces of the plates, thereby causing the particles to be thrown away from the plates by virtue of the centrifugal force imparted thereto.

In the drawings, reference numeral 7 represents a hollow vertical shaft to which the respective plates are fixed. Numeral 8 represents a driving means to drive the shaft. Numeral 9 represents a lever for starting and stopping the driving means. Numeral 10 represents a cover of the manhole provided at the lower portion of the tank 5. Numeral 11 represents a pipe for introducing and discharging the beer which is provided with a valve 12 and which communicates with the bottom of the tank 5. Numeral 13 represents a pipe for supplying a coolant. Numeral 14 represents a pipe for draining the coolant. Numeral 15 represents a pipe for exhausting formed gas. Numeral 16 represents a bearing for the rotary shaft 7. Numeral 17 represents a water-swivel means for supplying water into the shaft 7 through a water supply pipe 18. Numeral 19 represents a water introducing hole provided through the wall of said shaft 7 and within said water-swivel means. Numeral 20 represents a water discharge hole provided through the wall of said shaft 7 and located at a position above the respective plates 6. When a tank having such structure is used as a fermentation tank, it is also possible to accelerate fermentation by rotating the plates and thereby stirring the fermenting liquid.

An example of the present invention will next be described. For comparison, a tank of the present invention having a liquid depth of 10 meters and equipped with 4 plates spaced at 2 meters' intervals as test zone, and a conventional tank of the same dimensions without plates as control zone, were used. Beer was stored in each tank and the changes in the number of yeast suspended in the beer were determined, with the following result.

|  | Test zone—location of samplings | | | | | Control zone—location of samplings | | | | |
| --- | --- | --- | --- | --- | --- | --- | --- | --- | --- | --- |
|  | $P_1$ | $P_2$ | $P_3$ | $P_4$ | $P_5$ | $K_1$ | $K_2$ | $K_3$ | $K_4$ | $K_5$ |
| 0 day | 25.0 | 25.5 | 25.5 | 25.7 | 25.5 | 25.0 | 25.5 | 25.5 | 25.5 | 26.0 |
| 10 days | 9.0 | 9.0 | 9.5 | 10.5 | 11.0 | 10.0 | 11.5 | 14.0 | 14.0 | 16.2 |
| 20 days | 4.5 | 4.5 | 5.5 | 6.0 | 6.0 | 5.5 | 8.5 | 10.5 | 11.5 | 14.0 |
| 30 days | 4.5 | 4.5 | 4.5 | 5.0 | 5.5 | 5.0 | 8.0 | 10.0 | 10.0 | 12.0 |

In the above table, $P_1 \ldots P_5$ and $K_1 \ldots K_5$ represent, respectively, the locations of the samplings in the test zone and in the control zone, respectively. $P_1 \ldots P_5$ represent, respectively, the mid portions in the layers of liquid which are defined by the adjacent plates which serve as partitions. $K_1 \ldots K_5$ represent, respectively, the innermost portion of the liquid, corresponding to $P_1 \ldots P_5$. The number of the suspend yeast is expressed as $10^3$ cells/cm.$^3$ beer.

The result of the experiment shows that the sedimentation of the yeast is markedly accelerated in the test zone as compared with the control zone, and also that the respective layers of beer are substantially uniformly conditioned with the test zone. This bespeaks the remarkable improvement in the function and the effect of the tank of the present invention.

As has been stated, the tank of the present invention not only accelerates the sedimentation of the yeast and the coagulated substances separating in the beer during its main and after fermentation stages, thereby materializing a very prompt clarification of the beer, but also permits uniform fermentation of the beer. Thus, the tank of the present invention is quite useful when used in the brewing of beer.

The embodiments of the invention in which an exclusive property or privilege is claimed are defined as follows:

1. A fermentation and storage apparatus for use in brewing beer, comprising:
    an upright tank;
    a plurality of substantially equally vertically spaced, substantially horizontal, substantially parallel shelves supported in said tank, each of said shelves being of a generally plate-form configuration and occupying a major portion of the cross section of said tank, said shelves having substantially parallel upper surfaces for collecting sediments present in said beer, said shelves dividing said tank into a plurality of vertically offset zones of generally equal volume, each of said zones being isolated from the others of said zones except for minor portions of the cross section of said tank, said upper surfaces being non-outwardly and downwardly inclined whereby the sediments are retained thereon, the spaces between the surfaces of said shelves being open and unobstructed so that the sediments in the zones between said shelves are free to settle downwardly onto the upper surfaces of the shelves;
    whereby said shelves collect said sediments by deposition at intermediate levels in said tank so that the beer is clarified at an accelerated rate.

2. A fermentation and storage apparatus according to claim 1, in which each of said shelves is divided into several segments adapted to be opened downwardly.

3. A fermentation and storage apparatus according to claim 1, in which said shelves are fixed to a rotary shaft supported centrally in said tank and rotated by a driving means disposed outside the upper end of said tank, said shelves extending to said shaft so that the central regions of said zones are isolated from each other.

4. A fermentation and storage apparatus according to claim 3, in which said rotary shaft is hollow and is provided with a plurality of washing nozzles disposed above the upper surfaces of said shelves and arranged for discharging washing fluid onto the central regions of said shelves and thence outwardly toward the peripheries of said shelves.

5. A fermentation and storage apparatus according to claim 4, in which said tank comprises an inner sleeve and an outer sleeve spaced from said inner sleeve, a cooling jacket surrounding the external periphery of said inner sleeve, a heat insulator sandwiched between said inner sleeve and said outer sleeve, a conduit communicating with the lower end of the tank for introducing and draining beer, and a conduit communicating with the upper end of the tank for venting gas.

6. A fermentation and storage apparatus according to claim 1, including a shaft rotatably supported within said tank, said shaft having a plurality of vertically spaced and parallel plates secured thereto and further including means for rotatably driving said shaft whereby when said tank is used for the fermentation of beer, the rotation of said shaft will result in the rotation of said plates to cause a stirring of the fermenting beer to accelerate the fermenting process.

7. The device defined in claim 1, wherein said shelves have a plurality of small openings therethrough whereby carbon dioxide gas formed during fermentation will be permitted to rise through said central region of said tank.

References Cited

UNITED STATES PATENTS

| 2,135,622 | 11/1938 | Nagle | 99—277.1 |
| 3,071,469 | 1/1963 | Krabbe | 99—277.1 X |

ROBERT W. JENKINS, *Primary Examiner.*

U.S. Cl. X.R.

343—777; 333—11